Aug. 15, 1950    G. D. BROOKS    2,519,222
GLARE ELIMINATOR
Filed Aug. 13, 1947

Inventor
George D. Brooks
By Clarence A. O'Brien
and Harvey B. Jacobson
Attorneys Patented Aug. 15, 1950

2,519,222

UNITED STATES PATENT OFFICE 2,519,222

GLARE ELIMINATOR

George D. Brooks, Oil Hill, Kans.

Application August 13, 1947, Serial No. 768,287

4 Claims. (Cl. 248—206)

The present invention relates to shield-type glare eliminators such as are used, while driving at night, to intercept and minimize glare from the headlights of oncoming cars; and which are used, if desired, during the day as anti-glare sun shields.

Glare eliminators and sun shields are of many and varied types in the field of invention herein under advisement. Broadly such appliances and devices have to do with a bracket or equivalent fixture which is in some manner attached to the windshield or adjacent part of the car, the same serving to accommodate a hingedly mounted plate, panel or the like of a suitable transparent nature, the same being swung up and out of the line of vision of the driver when not in use and being swung down in somewhat parallel relation to the windshield, when in use to perform as an interceptor for a glaring light rays.

The field to which the invention relates is highly well developed and, like other inventors in this field of endeavor, I aim to structurally, functionally and otherwise improve upon known devices, while at the same time providing a structure which is within the realm of simplicity and efficiency.

In carrying out the principles of the present inventive concept I have evolved and produced a fixture which is attachable, by suction cups to the windshield glass, the same being such that it is stabilized and being satisfactorily constructed to accommodate accessories used on the transparent shield for purposes of hingedly mounting same for ready operation and use.

More explicitly, I provide a device which relies for novelty upon a suitably colored transparent glass or equivalent panel, this constituting the shield proper, the same having bearings to accommodate a supporting shaft and further including friction retention devices cooperable with the bearings and shaft.

Other objects and advantages will become more readily apparent from the following description and drawings.

In the drawings, wherein like numerals are employed to designate like parts throughout the same:

Figure 1:
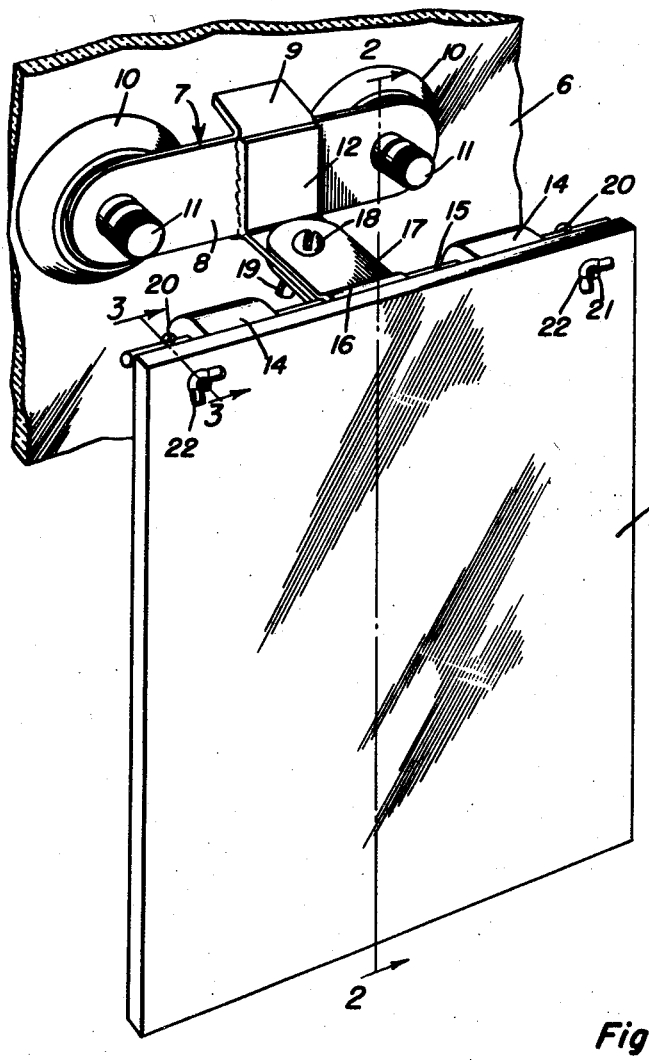
Figure 1 is a fragmentary perspective view of a portion of an automobile windshield provided with the adapter bracket or fixture and showing the glare shield and appliances carried thereby for purposes of appropriately supporting the shield.
Figure 2:
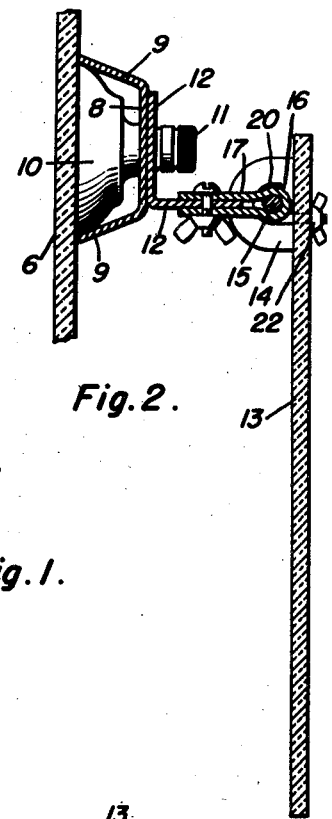
Figure 2 is a vertical fragmentary sectional view taken on the central line 2—2 of Figure 1, looking in the direction of the arrows.
Figure 3:
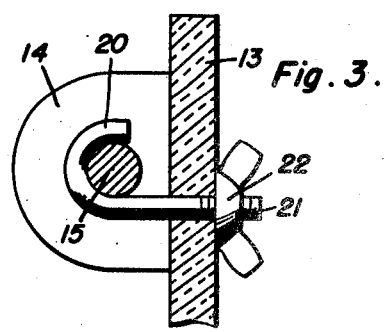
Figure 3 is an enlarged fragmentary detail section on the line 3—3 of Figure 1; and, Figure 4 is a perspective view of the transparent shield proper.
Figure 4:
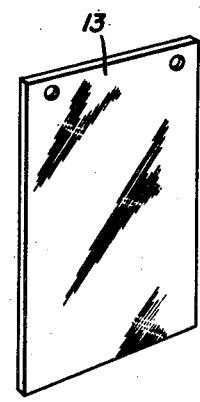

Referring to the drawings by reference numerals and lead lines, the automobile or equivalent windshield glass is denoted by the numeral 6 and the adapter bracket or fixture, which is separably connectable thereto is denoted by the numeral 7. The bracket comprises a relatively short strip of metal or equivalent stock 8 which is provided with laterally directed stabilizing legs 9 resting against the windshield. The opposite end portions of said strip have openings to accommodate studs carried by rubber suction cups 10 connected with the windshield. The studs in turn project through the apertures and accommodate the clamping and assembling nuts 11. The central portion of the bracket strip 8 is provided with an L-shaped member 12.

The panel-like glass or equivalent anti-glare shield is denoted by the numeral 13. This is in the form of a suitably colored transparency of appropriate dimensions and is adapted to be suspended in the line of vision of the driver. It is provided on its normal upper end, on the outer side with a pair of wooden, rubber or equivalent bearings 14 and these are situated, as shown to accommodate end portions of a supporting and hinging rod 15. The rod passes through the bearings and therefore said shield 13 is rockable on the rod. The central portion of the rod is welded or otherwise secured in the tubular portion 16 of a clip 17. The clip is supported on the L-member 12 held in place by an assembling and hinging bolt 18 and associated wing nut 19. This provides suspension for the shield, permitting the same to be properly angled by adjustment in a horizontal plane about a vertical axis. I next call attention to stabilizing and tensioning members and these are in the form of J-shaped bolts whose hooked bills 20 engage and partially embrace the rod-ends 15. The shank portions of the bolts pass through holes provided therefor in the glass shield 13 as at 21 where said shanks accommodate thumb-nuts 22. It is possible to screw the thumb-nuts and tighten the bolts and thus place the desired frictional tension on the rod-ends, this in a manner to make sure that when the shield is down, it may be "locked" down, and when swung up and out of the way, may likewise be "locked" in an up position. It follows that we have a transparency 13 which is liftable and lowerable and swingable through a vertical plane and rockable on a horizontal axis provided by the bearings and rod means. We have in addition an adjustment at right angles on the vertical pivot 18. The entire device including the rubber suction cups may be applied and removed, as desired.

In operative position, my device is attached to any windshield in any desired position or any desired place on windshield.

Preferably, for night driving, and for best results, the device should be placed, by attaching to rubber suction cups, to the extreme left side of the windshield, or to the left of the steering wheel. The device should be so placed that the middle of the colored plate, when down in operative position will be in line of the driver's vision down the highway. The plate is then turned up out of the line of vision until needed. When bright lights are approaching, the colored plate is pulled down with a touch of the finger to operative position. By shifting the head slightly to bring the eliminator between the eyes and the approaching lights, the bright glare is "killed," but the approaching car and the road is clearly visible. At the same time the view of the right side of the road remains entirely clear and unobstructed at all times, as the glare eliminator takes up but a small space of the windshield.

As soon as the lights are passed a touch of the finger raises the eliminator plate entirely out of the line of vision and clears the windshield of any obstruction. There is no trace of the momentary blindness the driver usually experiences after the passing of brilliant lights, and one of the greatest hazards of night driving is reduced to a minimum. The action is quick, simple, and sure.

By substituting a somewhat larger and longer and darker colored glass, and attaching to the device horizontally, and placed toward the middle of windshield in line with driver's vision, an excellent sun glare eliminator is provided, with same quick clearance of view as desired.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a structure of the class described, a fixture attachable to a windshield or the like, a horizontal panel supporting rod, a clip rigidly connected to the intermediate portion of said rod and hingedly connected, on a vertical axis, to said fixture, together with a panel, said panel having bearings and said bearings being rockable on said rod, together with J-shaped bolts carried by the end portions of said panel and having their hooked ends partially and frictionally embracing adjacent end portions of said rod.

2. An attachment for automobile windshields comprising a fixture, said fixture having suction cups, including a strip substantially parallel to the windshield and an L-shaped member, a plate provided with bearings, a horizontal rod, said rod having end portions mounted in said bearings, and a clip secured to the intermediate portions of said rod and extending laterally therefrom and hingedly and detachably connected with said L-shaped member.

3. A windshield attachment of the class described comprising a fixture attachable to a windshield or the like, said fixture comprising a horizontally elongated strip provided at opposite ends with suction cups attachable to said windshield, provided intermediate its ends and between said suction cups with lateral bracing legs also contactable with the windshield, and provided, also intermediate its ends, with an L-shaped member, a rod member adapted to accommodate bearings on a plate, said rod member being provided intermediate its ends with a rigidly attached clip, said clip being connected, by a vertical pivot, to the horizontal limb of said L-shaped member.

4. A windshield attachment of the class described comprising a fixture attachable to a windshield or the like, said fixture comprising a horizontally elongated strip provided at opposite ends with suction cups attachable to said windshield, provided intermediate its ends and between said suction cups with lateral bracing legs also contactable with the windshield, and provided, also intermediate its ends with an L-shaped member, a rod member adapted to accommodate bearings on a plate, said rod member being provided intermediate its ends with a rigidly attached clip, said clip being connected by a vertical pivot to the horizontal limb of said L-shaped member, together with a pair of J-shaped bolts cooperable with the end portions of said rod member and adapted to be detachably connected with said plate.

GEORGE D. BROOKS.

REFERENCES CITED

The following references are of record in the file of this patent:

UNITED STATES PATENTS

| Number | Name | Date |
|---|---|---|
| 1,403,545 | Eibye | Jan. 17, 1922 |
| 1,483,640 | Manning | Feb. 12, 1924 |
| 1,600,461 | Ensign | Sept. 21, 1926 |
| 1,776,496 | Eiland | Sept. 23, 1930 |
| 1,835,187 | Simmons | Dec. 8, 1931 |
| 1,844,289 | Littlejohn | Feb. 9, 1932 |
| 1,922,295 | Hunter | Aug. 15, 1933 |
| 2,160,505 | Jacobs | May 30, 1939 |